May 15, 1962 T. PIKE 3,034,797
FLUID SEALS BETWEEN ROTATING PARTS
Filed Dec. 10, 1957

INVENTOR
TERENCE PIKE

BY
Watson, Cole, Grindle &
Watson
ATTORNEYS

United States Patent Office 3,034,797
Patented May 15, 1962

3,034,797
FLUID SEALS BETWEEN ROTATING PARTS
Terence Pike, Rotherham, England, assignor to D. Napier & Sons Limited, London, England, a British company
Filed Dec. 10, 1957, Ser. No. 701,903
Claims priority, application Great Britain Dec. 12, 1956
6 Claims. (Cl. 277—28)

This invention relates to fluid seals between two relatively rotating members, of the kind including an annular sealing ring connected to one of the members and urged into contact with a part of the other rotary member to form a substantially fluid tight rotary seal therewith. Normally one of the main relatively rotary members will be stationary and the other will rotate, for example where a rotating shaft passes through a stationary wall. For convenience herein one of the members will be referred to as stationary and the other as rotating, but it will be understood that the invention may be applied equally to seals between two members both of which are rotating, at different speeds or in opposite directions.

It is an object of the invention to provide an improved seal of the kind referred to and now according to the invention a rotary fluid seal comprises an annular sealing ring connected to one of the two main rotary members, means urging this annular sealing ring against the other rotary member to form a substantially fluid tight seal therewith, and means for adjusting the load on the annular sealing ring to provide different loading forces at the sealing surface.

Thus it has been found that under normal operating conditions a relatively high end load is required on the sealing ring to afford an effective seal, whereas at low speeds the same end load may be too high and the sealing surface may be damaged or the effectiveness of the seal impaired if it is run at this low speed for prolonged periods.

In one preferred arrangement the means for adjusting the loading force are arranged to be actuated automatically by operation of a device, such as a motor, which is normally or primarily in operation when the rotary members are moving at low relative speeds.

Alternatively the means for adjusting the loading force may be coupled to a speed responsive governor sensitive to the relative speed of rotation of the two members and arranged to alter the loading force automatically in response to changes in the relative speed of rotation.

The loading force will normally be reduced at lower rotational speeds.

The ring loading means conveniently comprises a hydraulic piston and cylinder, and the load adjusting means comprise means for controlling the pressure in the hydraulic cylinder.

In such case the pressure control means preferably comprises a leak valve in a hydraulic supply passage to the cylinder.

In any case the seal preferably includes means for supplying oil independently to the sealing surface of the sealing member.

The invention may be performed in various different ways but two specific embodiments will now be described by way of example as applied to a face seal between the shaft and casing of a hydrogen filled alternator.

In the accompanying drawings

Figure 1:
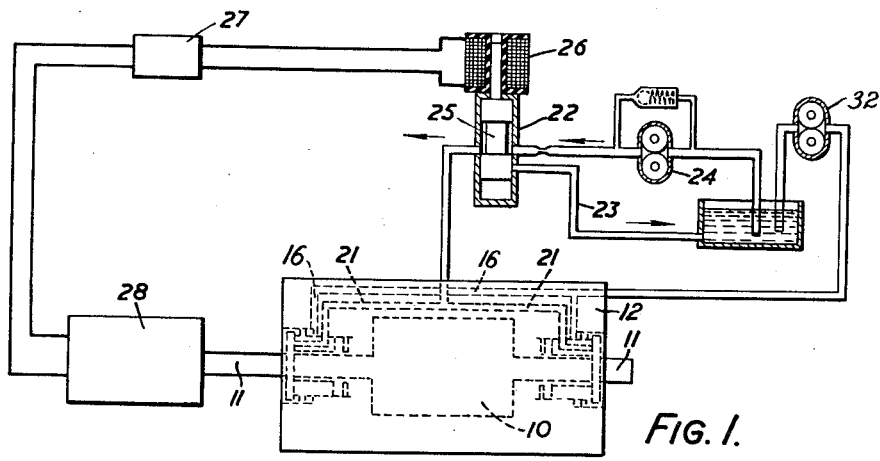
FIGURE 1 is a diagrammatic illustration of the alternator showing the hydraulic control circuit for varying the end load on the fluid seals.
Figure 2:
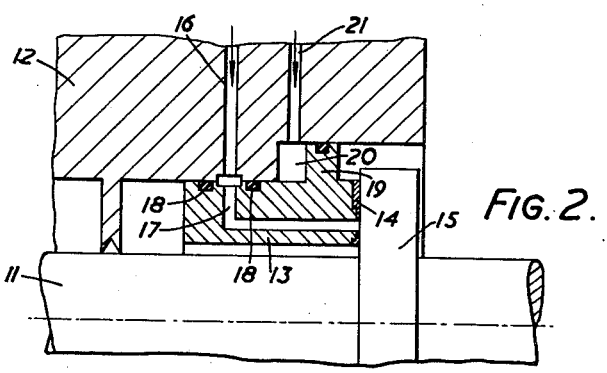
FIGURE 2 is a fragmentary sectional view on an enlarged scale through one of the fluid seals.

In the first example the armature 10 of the alternator is mounted on a shaft 11 both ends of which extend through the end walls of the alternator casing 12, and a rotary fluid seal is provided at both points, one such seal being illustrated in detail in FIGURE 2. A substantial clearance is provided between the shaft 11 and the casing 12 and in this clearance is mounted an annular sealing ring 13, one end face of which is provided with an anti-friction sealing surface 14 which is arranged to engage the corresponding face of an annular flange 15 on the shaft 11. The sealing ring is connected to the casing so as to be capable of limited movement in an axial direction but restrained against rotation by a splined connection for example (not shown). Pump 32 (FIGURE 1) is provided for supplying sealing oil to the face 14 of the sealing ring through a supply passage 16 in the casing and a corresponding series of drillings 17 in the sealing ring. The movement of the sealing ring in an axial direction is limited and the communication between the supply passage 16 and the drillings 17 is not interrupted by such movements. The junction between the casing and the sealing ring is sealed on either side of the supply passage by annular O-rings 18 mounted in the external surface of the sealing ring lying on either side of this passage. These O-rings also act as fluid seals between the annular sealing ring 13 and the casing.

In order to provide the required end load on the sealing ring, the ring is formed with a radial flange 19 lying in a corresponding annular recess in the casing, and the part of the recess on the side of this radial flange remote from the sealing face 14 constitutes an annular hydraulic chamber 20. Hydraulic liquid is supplied to this chamber under pressure through a pressure supply passage 21 in the casing.

In accordance with the invention means are provided for adjusting the pressure in this hydraulic chamber 20, these means including a leak valve 22 controlling the escape of hydraulic fluid to a branch 23 of the pressure supply passage which constitutes a relief or return line. As will be seen from FIGURE 1 a pump 24 delivers pressure fluid to the valve 22, which in its normal open position transmits this pressure to the passages 21, and hence to the chambers 20. If the valve spindle 25 is moved downwards the branch passage 23 is opened, and the pressure in the chambers 20 accordingly falls thus reducing the end load on the sealing rings 13. The valve spindle 25 is controlled by a solenoid 26 energized by a relay 27 which is electrically coupled to a governor 28 responsive to the speed of rotation of the shaft 11 and is arranged to be actuated when the speed of this shaft is below a predetermined value. Thus at low speeds of the shaft 11 the solenoid 26 will open the leak valve, thus reducing the loading on the sealing face 14.

Figure 3:
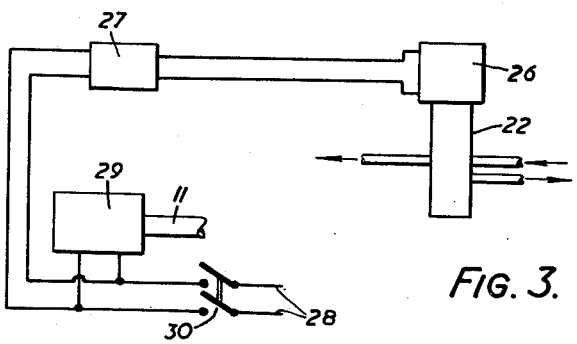
FIGURE 3 is a diagrammatic illustration of an alternative control circuit.

In the modified control circuit illustrated in FIGURE 3 the valve 22 is controlled as before by a solenoid 26 energized by a relay 27, but the relay is coupled to the main current supply leads 28 leading to a "barring" motor 29 connected to the alternator shaft 11. The current supply to the motor is controlled by a switch 30, which thus also controls the supply current to the relay 27. The alternator is normally driven by a high powered prime mover such as a steam turbine (not shown) and the barring motor 29 is only employed to rotate the shaft 11 slowly, when the alternator is out of use for long periods. If the shaft is allowed to remain stationary it is possible that the heavy weight of the armature may distort the shaft or its bearings. It will be seen that when the motor 29 is energized, which necessarily means that the shaft 11 is rotating slowly, the hydraulic pressure acting on the sealing rings 13 will be substantially reduced.

What I claim as my invention and desire to secure by Letters Patent is:

1. Loading means for a rotary fluid seal between two relatively rotating members, having an annular sealing ring connected to one of the two main rotary members, in which the loading means comprises means urging this annular sealing ring against the other rotary member to form a substantially fluid tight seal therewith, including means for adjusting the load on the annular sealing ring to provide different loading forces at the sealing surface, and including means sensitive to the relative speed of rotation of the two members and coupled to the means for adjusting the load, to alter the loading force automatically in response to predetermined changes in the relative speed of rotation.

2. Loading means as claimed in claim 1, in which the loading force is reduced at lower relative speeds.

3. Loading means as claimed in claim 1, including a slow speed motor and means for coupling this motor to one of the rotating members, and in which the means for adjusting the loading force are actuated by means controlling the operation of the slow speed motor.

4. Loading means as claimed in claim 1 in which the loading means comprise a hydraulic piston and cylinder, and the load adjusting means comprise means for controlling the pressure in the hydraulic cylinder.

5. Loading means as claimed in claim 4 including means for supplying oil independently to the sealing surface of the sealing member.

6. Loading means for a rotary fluid seal between two relatively rotating members having an annular sealing ring connected to one of the two main rotary members, and means for supplying a sealing liquid to the sealing surfaces of this sealing ring and the opposed rotary member, in which the loading means comprises means urging this annular sealing ring against the other rotary member to form a substantially fluid-tight seal therewith, means for adjusting the load on the annular sealing ring comprising a hydraulic piston and cylinder, and means for controlling the pressure in the hydraulic cylinder independently of the pressure of the liquid supply to the sealing surfaces, and including means sensitive to the relative speed of rotation of the two members and coupled to the means for controlling the pressure in the hydraulic cylinder to alter the loading force on the sealing ring automatically in response to changes in the relative speed of rotation.

References Cited in the file of this patent

UNITED STATES PATENTS

| | | |
|---|---|---|
| 2,265,953 | Mortensen | Dec. 9, 1941 |
| 2,328,698 | Wiessner | Sept. 7, 1943 |
| 2,347,751 | Reeves | May 2, 1944 |
| 2,350,753 | Grobel | June 6, 1944 |
| 2,636,786 | Greenough | Apr. 28, 1953 |
| 2,649,318 | Skillman | Aug. 18, 1953 |
| 2,650,116 | Cuny | Aug. 25, 1953 |
| 2,805,090 | Creek | Sept. 3, 1957 |
| 2,834,619 | McNab | May 13, 1958 |